US010118643B2

(12) United States Patent
Komiya et al.

(10) Patent No.: US 10,118,643 B2
(45) Date of Patent: Nov. 6, 2018

(54) FRONT SUB-FRAME STRUCTURE

(71) Applicant: MAZDA MOTOR CORPORATION, Hiroshima (JP)

(72) Inventors: Katsuyuki Komiya, Hiroshima (JP); Masaaki Tanaka, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/761,176

(22) PCT Filed: Nov. 1, 2016

(86) PCT No.: PCT/JP2016/082477
§ 371 (c)(1),
(2) Date: Mar. 19, 2018

(87) PCT Pub. No.: WO2017/082125
PCT Pub. Date: May 18, 2017

(65) Prior Publication Data
US 2018/0257710 A1    Sep. 13, 2018

(30) Foreign Application Priority Data

Nov. 11, 2015  (JP) ................................ 2015-221131

(51) Int. Cl.
*B62D 21/06* (2006.01)
*B62D 21/11* (2006.01)
(Continued)

(52) U.S. Cl.
CPC ............... *B62D 21/11* (2013.01); *B60K 5/12* (2013.01); *B62D 21/06* (2013.01); *B62D 25/085* (2013.01)

(58) Field of Classification Search
CPC ...... B62D 25/085; B62D 21/06; B62D 21/11; B62D 21/155; B62D 21/152; B60K 5/12
See application file for complete search history.

(56) References Cited

U.S. PATENT DOCUMENTS

| 8,011,695 B2 * | 9/2011 | Kosaka | B62D 25/2018 280/784 |
| 9,096,276 B2 * | 8/2015 | Komiya | B62D 21/155 |

(Continued)

FOREIGN PATENT DOCUMENTS

| DE | 10 2007 035 510 A1 | 1/2009 |
| JP | 2013-159223 A | 8/2013 |
| JP | 2013-203241 A | 10/2013 |

OTHER PUBLICATIONS

International Search Report issued in PCT/JP2016/082477; dated Dec. 6, 2016.

*Primary Examiner* — Brian L Swenson
(74) *Attorney, Agent, or Firm* — Studebaker & Brackett PC

(57) ABSTRACT

To reinforce a front sub-frame in such a manner that the front sub-frame having a trapezoidal shape formed by a cross member and left and right side members extending to one side is not deformed to a rhombus shape at the one side, a front sub-frame structure includes: a rear cross member (74) coupling arm supporting parts (71, 71) supported on left and right side members (6, 6); tilt members (75) coupling left and right intermediate portions of the rear cross member (74) to rear vehicle attachment parts (M3) of the side members (6); a brace (80) coupling the left and right arm supporting parts (71, 71) to the rear vehicle attachment parts (M3); and intermediate coupling parts (91) coupling the brace (80) to intermediate portions of the tilt members (75).

3 Claims, 9 Drawing Sheets

(51) Int. Cl.
*B60K 5/12* (2006.01)
*B62D 25/08* (2006.01)

(56) References Cited

U.S. PATENT DOCUMENTS

| | | |
|---|---|---|
| 9,434,416 B2 * | 9/2016 | Isakiewitsch .......... B62D 21/11 |
| 9,682,727 B2 * | 6/2017 | Tanaka ................... B62D 21/11 |
| 2005/0062307 A1 * | 3/2005 | Nakagawa ............. B62D 21/02 |
| | | 296/29 |
| 2007/0284175 A1 * | 12/2007 | Misaki ................... B62D 21/11 |
| | | 180/296 |
| 2013/0241166 A1 | 9/2013 | Paintmayer et al. |
| 2016/0194029 A1 * | 7/2016 | Kramer .............. B60G 21/0555 |
| | | 280/124.109 |

* cited by examiner

FRONT SUB-FRAME STRUCTURE

TECHNICAL FIELD

The technique disclosed in this application relates to a front sub-frame structure disposed below a front side frame.

BACKGROUND ART

In a known structure, a sub-frame, a lower arm (lateral link), and a tension rod are disposed below a front portion of a front sub-frame structure to form a triangular shape in plan view, and thus, an engine is mounted in a rear portion of the front sub-frame structure where the lower arm and the tension rod, for example, are not disposed.

On the other hand, in many known structures, the rear portion of the front sub-frame has a frame structure that is constituted by a cross member coupled to left and right arm supporting parts and left and right side members extending rearward and has a rectangular shape in plan view that is open to the rear.

In the frame structure having such a rectangular shape in plan view in which one longitudinal side (one side in the front-rear direction) of the front sub-frame is open to this side, in a case where the engine is mounted at this side, engine support stiffness and lower arm support stiffness might decrease. In such a case, there arises a problem of inferior operation responsiveness in operating a steering wheel.

On the other hand, as exemplified by Patent Document 1 listed below, a sub-frame in which an X-shaped brace (3) formed by crossing a pair of beams in plan view is disposed in a rear portion of a front sub-frame to thereby reinforce the rear portion is proposed. Patent Document 2 describes a pair of tilt members that has longitudinal ends coupled to a cross member (1d) and left and right side members (1b), extends rearward, and tilts outward in the lateral direction (vehicle width direction or left-right direction) in such a manner that the distance between the tilt members in the vehicle width direction increases toward the rear in plan view.

CITATION LIST

Patent Documents

Patent Document 1: DE 102007035510
Patent Document 2: US 2013/0241166

SUMMARY OF THE INVENTION

Technical Problem

In Patent Document 1, however, the rear portion of the front sub-frame has a rectangular shape, such as a trapezoidal shape, in plan view that is open to the rear, and the brace cannot be made thick in the vertical direction (top-bottom direction) in order to avoid interference with, for example, the engine, and therefore, is easily warped. For this reason, even with attachment of the brace to the rear portion, the rear portion might be deformed to a rhombus shape in plan view, and this structure still has much room for investigation to the problems described above.

Patent Document 2 describes a tilt member included in a rear portion of a sub-frame, but fails to disclose a technical idea of including both the tilt member and a brace that complement each other and also fails to teach the problems described above.

It is therefore an object of the technique disclosed in this specification to provide a front sub-frame structure that can be reinforced in such a manner that a trapezoidal shape in plan view formed by a cross member coupled to left and right arm supporting parts and left and right side members extending to one side in the longitudinal direction to surround an engine is not deformed to a rhombus shape in plan view at the one side.

Solution to Problem

A front sub-frame structure according to a technique disclosed in this specification is a front sub-frame structure including a pair of left and right front side frames extending from a cabin front face toward a vehicle front, and a front sub-frame disposed below the front side frame and supporting a front suspension device, and includes: a cross member coupling arm supporting parts supported by the left and right side members of the front sub-frame; tilt members coupling laterally separated left and right intermediate portions of the cross member to longitudinally one-side vehicle attachment parts of the side members, the longitudinally one-side vehicle attachment parts being disposed at one longitudinal side of the side members; a brace coupling the left and right arm supporting parts to the longitudinally one-side vehicle attachment parts diagonally disposed to the arm supporting parts; and intermediate coupling parts coupling the brace to intermediate portions of the tilt members.

In this configuration, even in a case where the brace is thin, the intermediate coupling parts coupling the brace to the intermediate portions of the tilt members are provided to reduce vertical warpage of the brace, and thus, functions as the brace can be effectively obtained. In addition, the brace is coupled to the tilt members by the intermediate coupling parts so that a rear portion of a trapezoidal shape in plan view formed by the left and right side members and the cross member in the front sub-frame is allowed to have a structure of assembly of triangles (truss) by coupling the brace and the tilt members. Accordingly, it is possible to reduce deformation of the trapezoidal shape in plan view to a parallelogram shape, and thus, stiffness of the rear portion of the front sub-frame can be increased.

The longitudinally one-side vehicle attachment parts may be any of rear vehicle body attachment parts located at rear portions of the side members or front vehicle body attachment parts located at front portions thereof.

The cross member, the tilt members, and the side members are preferably coupled to each other by engine mount brackets.

With this configuration, engine support stiffness can be increased, and a roll and traction can be improved.

The brace preferably includes brace members disposed at left and right portions of the brace and at the one longitudinal side of the brace.

With this configuration, the brace itself forms truss structures, and thus, the number of truss structures can be increased so that stiffness can be further increased.

Advantages of the Invention

The technique disclosed in this specification can reinforce the front sub-frame configured in a trapezoidal shape in plan view formed by the cross member coupled to the left and right arm supporting parts and the left and right side members extending to one side in the longitudinal directions to surround an engine so that the front sub-frame is not deformed to a rhombus shape in plan view at one longitudinal side.

DESCRIPTION OF EMBODIMENTS

An embodiment will be described hereinafter with reference to the drawings.

FIGS. 1 through 7 illustrate a front sub-frame structure of an automobile of this embodiment.

Figure 1:
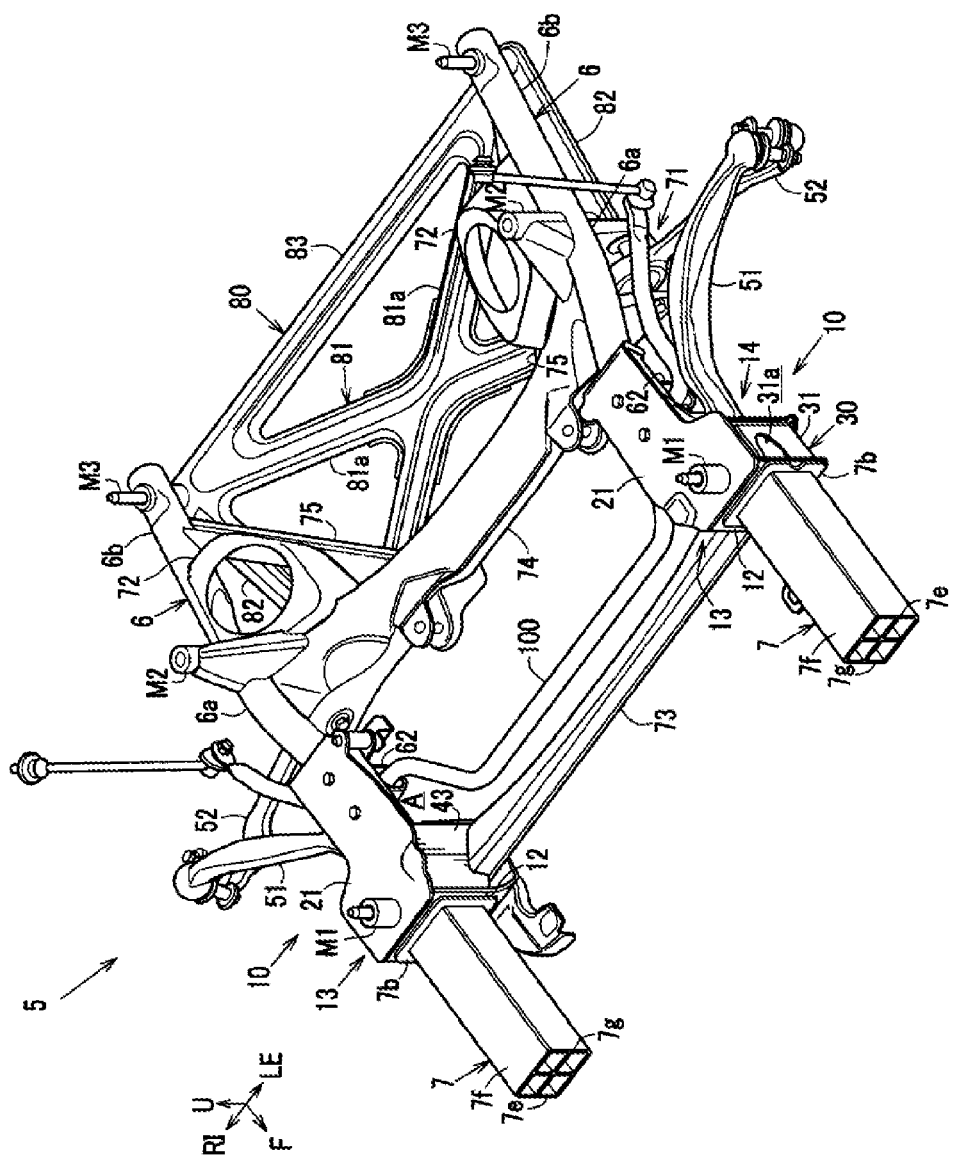
FIG. 1 is a perspective view of a front sub-frame of a vehicle according to an embodiment.
Figure 7:
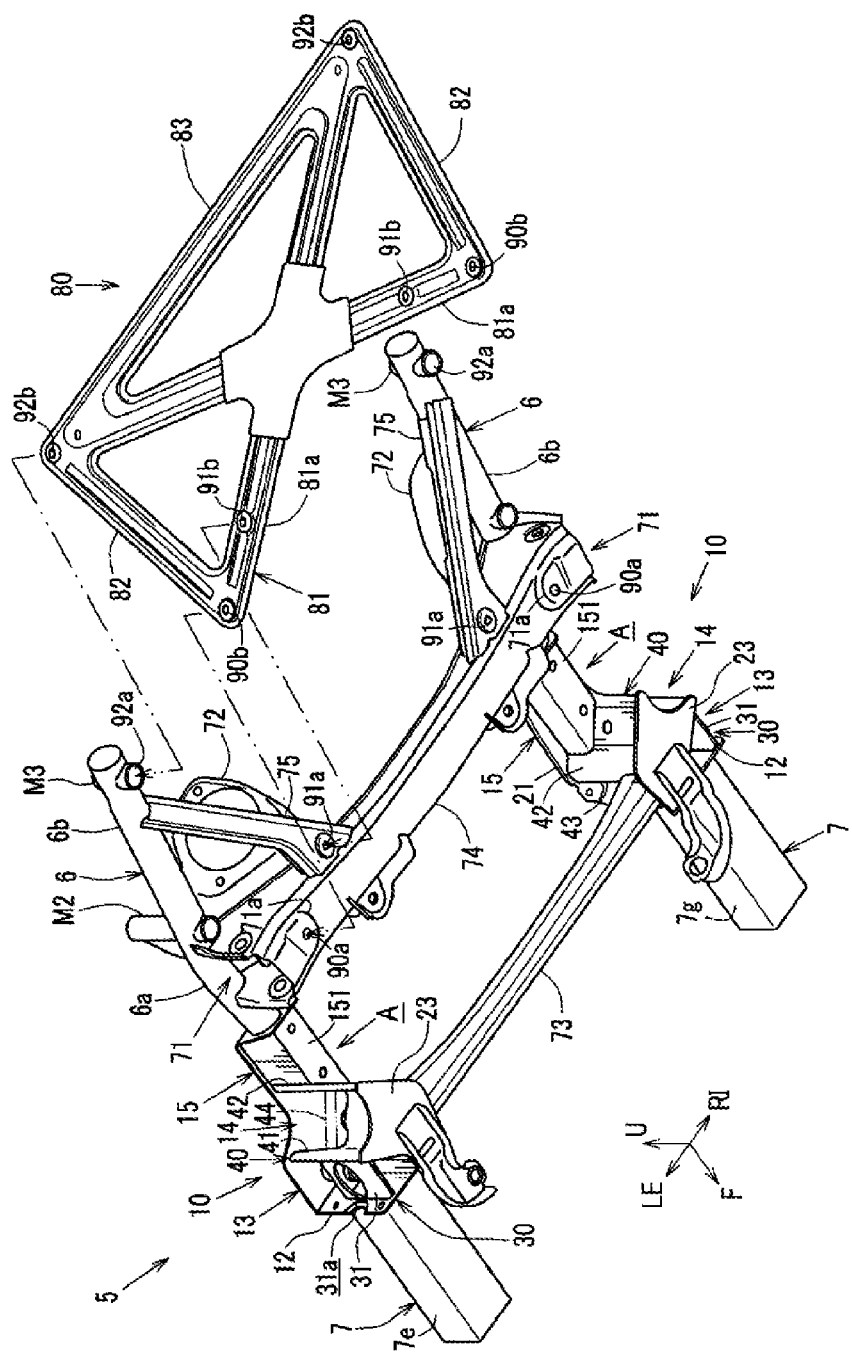
FIG. 7 is an illustration of a configuration of a brace of the front sub-frame.

In particular, FIG. 1 is a perspective view of a front sub-frame of the vehicle according to this embodiment when viewed downward from an obliquely left front portion. FIG. 7 is a disassembled perspective view of a brace and the front sub-frame from which the brace is detached, when viewed from below.

Figure 2:
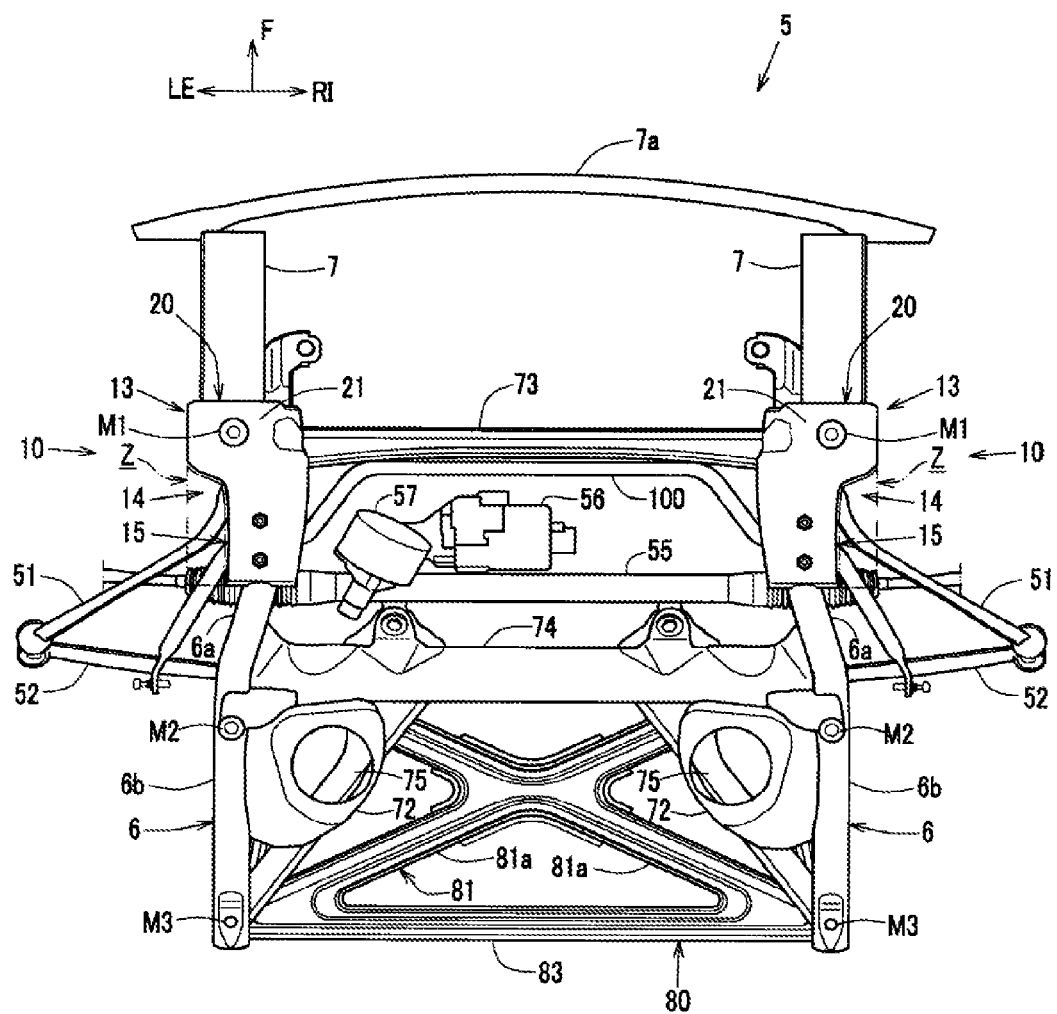
FIG. 2 is a plan view of the front sub-frame.
Figure 4:
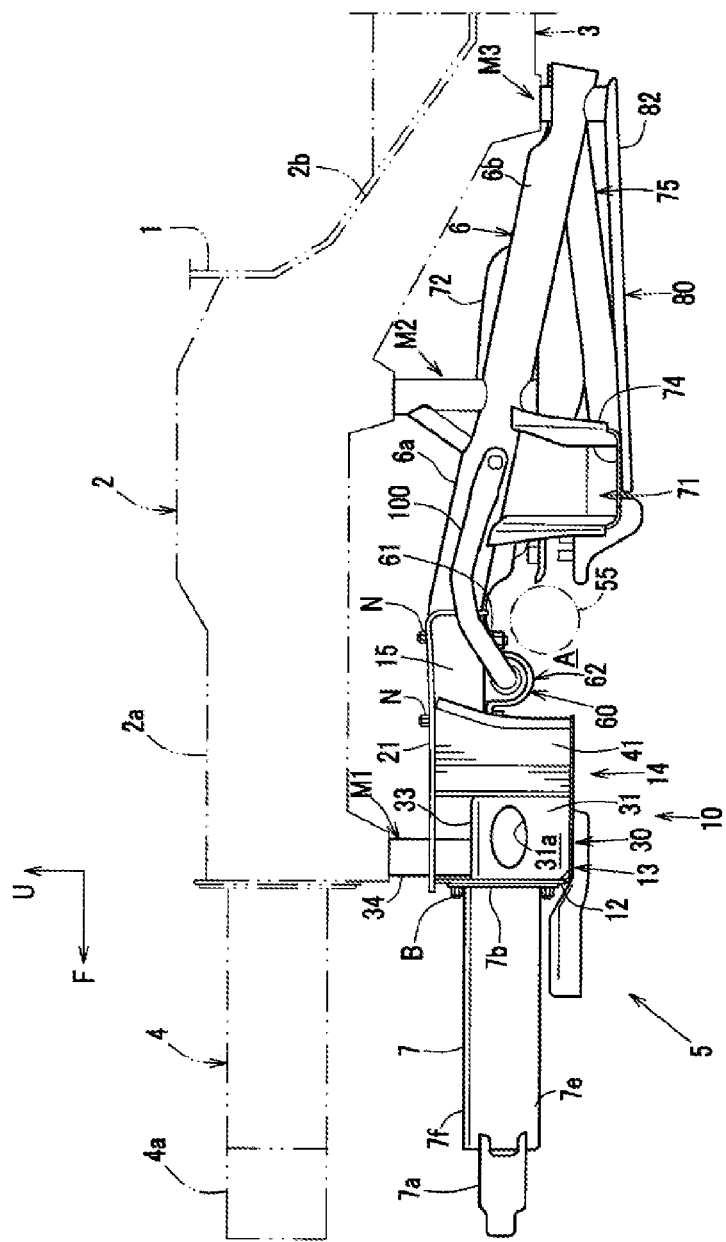
FIG. 4 is a left side view of the front sub-frame.
Figure 5:
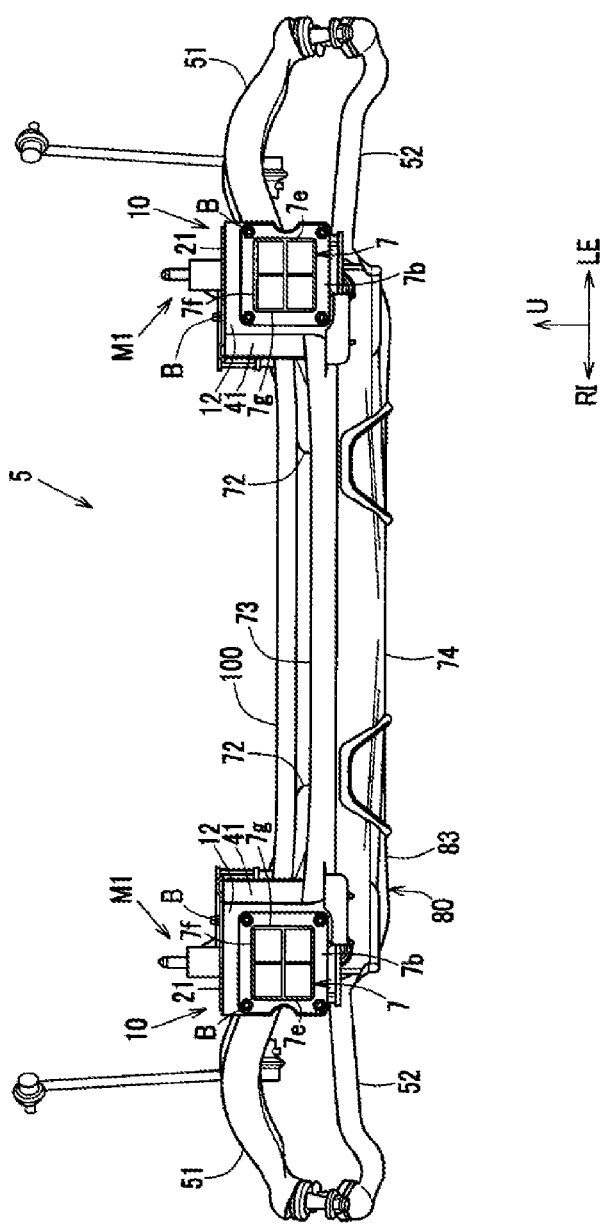
FIG. 5 is a front view of the front sub-frame.
Figure 6:
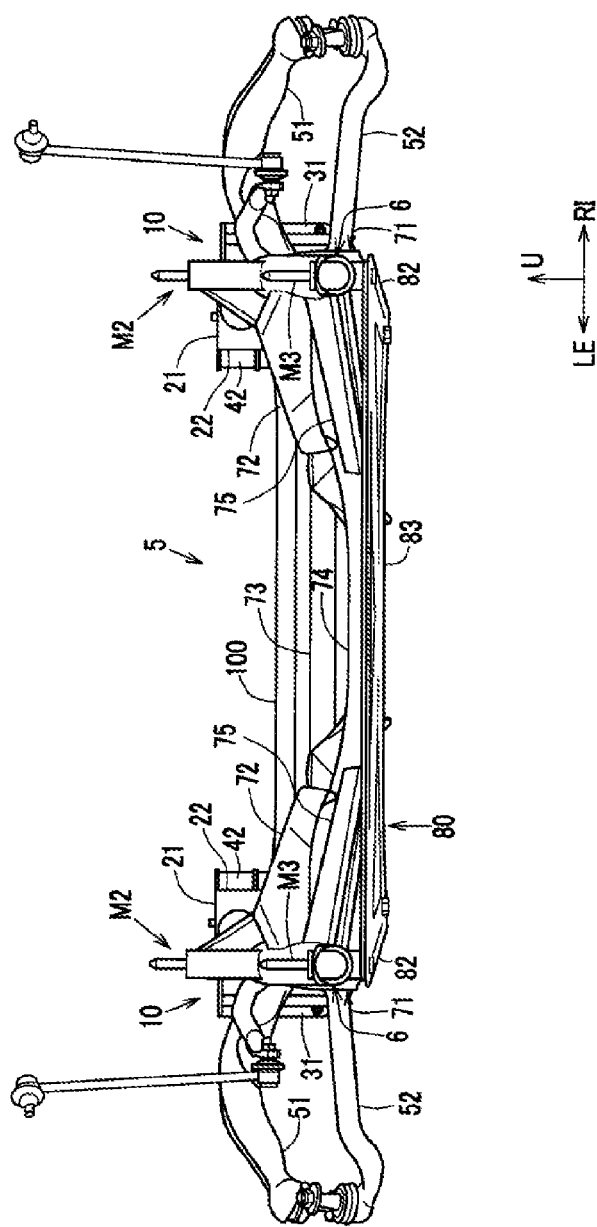
FIG. 6 is a rear view of the front sub-frame.
Figure 8:
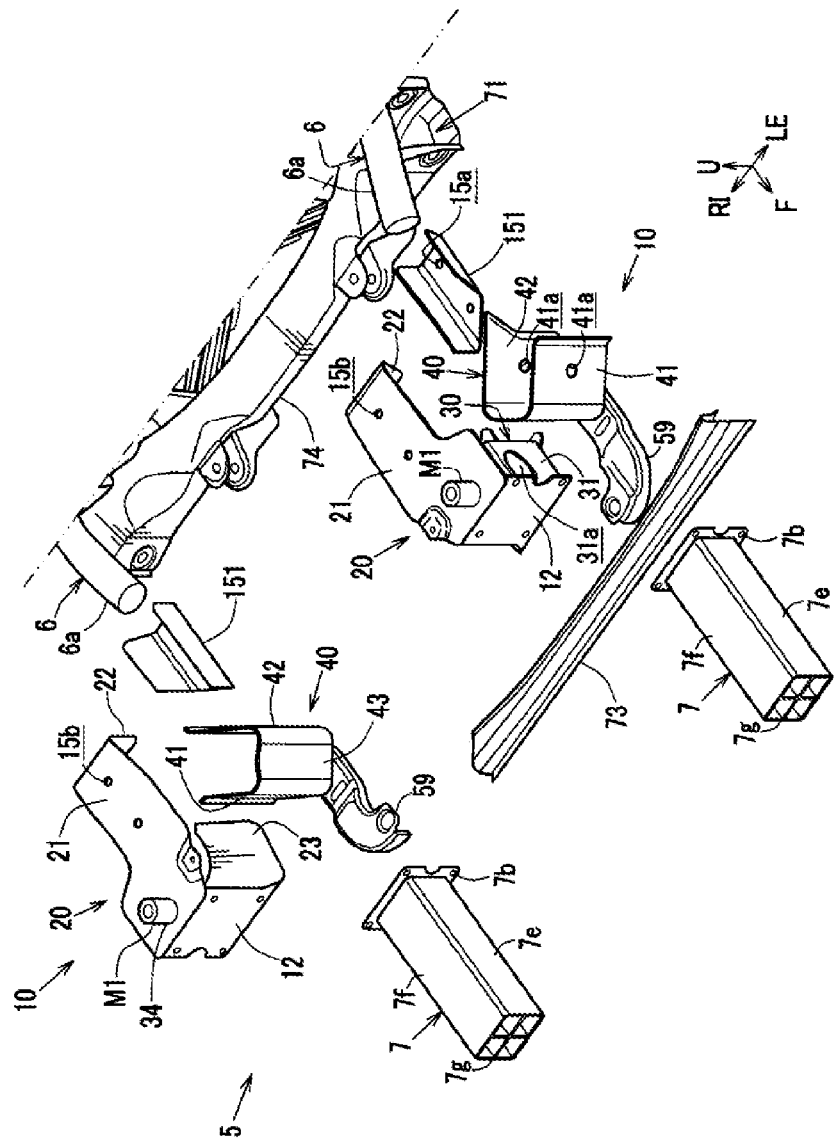
FIG. 8 is a disassembled perspective view of a front portion of the front sub-frame.

In the drawings concerning this embodiment except FIG. 2, a steering rack 55, a power steering actuator (a power steering motor) 56, and a power steering pinion 57 are not shown. FIG. 4 does not show tension rods 51 and lower arms 52. FIGS. 5 and 6 do not show a bumper reinforcement 7a. FIGS. 7 and 8 described later do not show a stabilizer support part 62 and a stabilizer 100, in addition to the bumper reinforcement 7a, the tension rods 51, and the lower arms 52. In addition, in the drawings concerning the following embodiment, arrow F represents the vehicle front, arrow LE represents the left in the vehicle width direction, arrow RI represents the right in the vehicle width direction, and arrow U represents upward of the vehicle.

As illustrated in FIG. 4, a front portion of the automobile includes a dash panel 1 disposed at a front face of a cabin and a pair of left and right front side frames 2 and 2 (only left one of which is shown) extending forward from a lower portion of the dash panel 1. Below the front side frame 2, as illustrated in FIGS. 1 through 6, a front sub-frame 5 supporting the lower arms 52 (lateral rods) (see FIGS. 1 and 2) substantially horizontally extending outward in the vehicle width direction and the tension rods 51 (see the same drawings) extending from ahead of the lower arms 52 to the rear and extending outward in the vehicle width direction are disposed.

Each of the front side frames 2 according to this embodiment includes a horizontal portion 2a extending substantially horizontally along the vehicle front-rear direction (longitudinal direction) in side view and a kick-up portion 2b (tilt portion) extending and declining rearward from the rear end of the horizontal portion 2a along the lower end of the dash panel 1. A floor frame 3 extending rearward in the vehicle is connected to the rear end of the kick-up portion 2b (see FIG. 4). The front end of the front side frame 2 is provided with a metal crash can 4 constituted by, for example, a cylindrical body projecting forward in the vehicle. A bumper reinforcement 4a extending in the vehicle width direction is attached to the front end face of the crash can 4.

As illustrated in FIGS. 1 through 7, the front sub-frame 5 mainly includes: a pair of left and right side members 6 and 6 extending in the vehicle front-rear direction (longitudinal direction); sub-crash cans 7 extending forward of the side members 6; a sub-frame front structure 10 (coupling member) coupling the side members 6 and the sub-crash cans 7 to each other in the longitudinal direction and constituting a front portion of the front sub-frame 5; a suspension cross member 73 (hereinafter referred to as a "sus-cross member 73") extending in the vehicle width direction to couple the pair of left and right sub-frame front structures 10 and 10; a rear cross member 74 extending in the vehicle width direction to couple the pair of left and right side members 6 and 6 to each other; a tilt member 75 coupled to the members 6, 6, and 74 behind the rear cross member 74 between the pair of side members 6 and 6; and a brace 80.

As illustrated in FIGS. 1, 2, and 4, mount parts M1, M2, and M3 (e.g., mount bushes and a mount pipe 34) each projecting upward are coupled to the front sub-frame 5 at three points at each of the left and right sides, that is, a front portion of the sub-frame front structure 10, a longitudinally intermediate portion of the side member 6, and the rear end of the side member 6. Specifically, the first mount part M1 (front vehicle body attachment part), the second mount part M2, and the third mount part M3 (rear vehicle body attachment part) are arranged in this order from the front to the rear.

As illustrated in FIG. 4, the first mount part M1 is coupled to the front end of the horizontal portion 2a of the front side frame 2 of the vehicle body, the second mount part M2 is coupled to a rear portion of the horizontal portion 2a, and the third mount part M3 is coupled to the front end of the floor frame 3 (as portion connected to the kick-up portion 2b).

In the manner described above, the front sub-frame 5 is mounted on the vehicle body at three points on one side in the longitudinal direction, that is, at six points in total on both lateral sides, and is disposed under the vehicle body.

Figure 3:
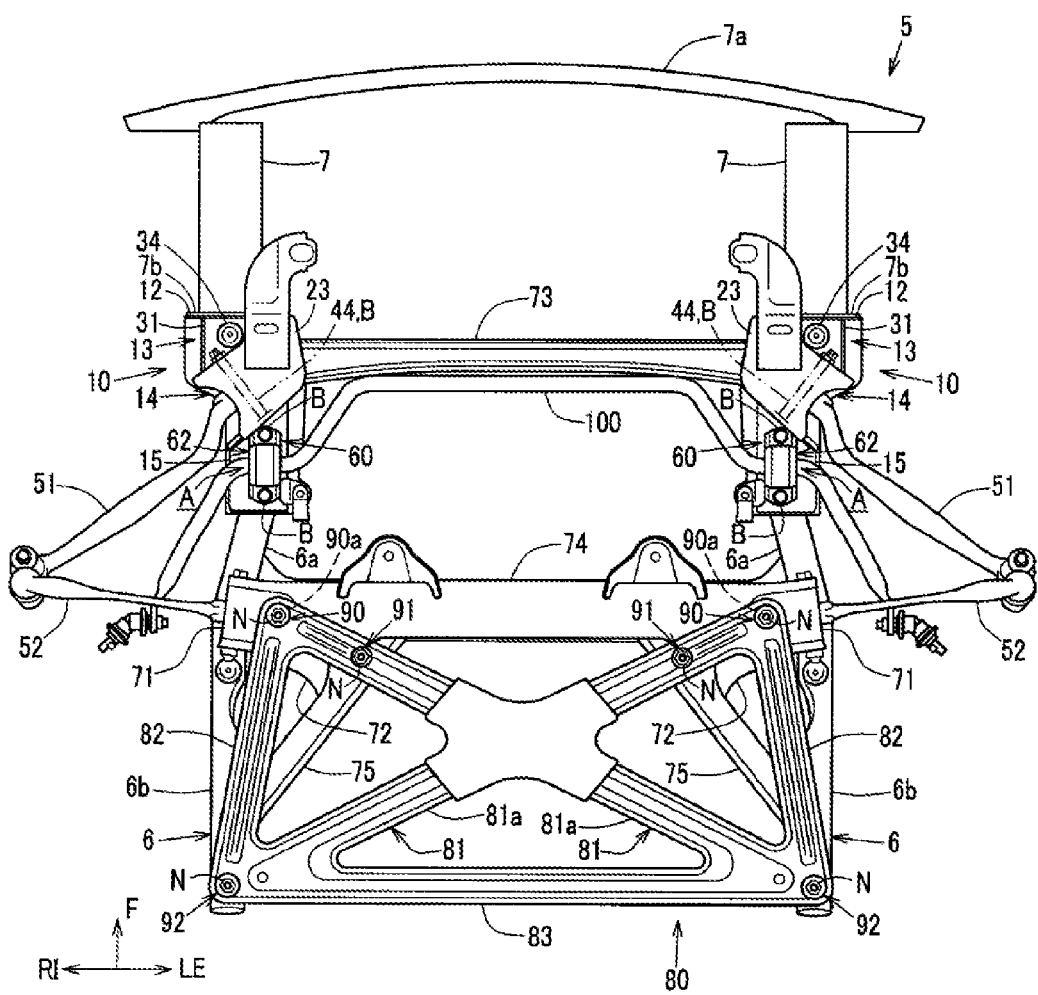
FIG. 3 is a bottom view of the front sub-frame.

The sub-crash cans 7 are impact energy absorbing members similar to the crash cans 4 at the front ends of the front side frames 2. As illustrated in FIGS. 2 through 4, a sub-bumper reinforcement 7a extending in the vehicle width direction are attached to the front ends of the sub-crash cans 7 and couples the front ends of the left and right sub-crash cans 7 to each other.

As illustrated in FIG. 4, the side members 6 are bridged below the pair of left and right front side frames 2 and the floor frame 3, and as illustrated in FIGS. 1 through 4 and 7, extend longitudinally in a rounded pipe shape. Each of the side members 6 includes a side member front portion 6a disposed ahead of the second mount part M2 in the longitudinal direction of the side member 6 and a side member rear portion 6b disposed behind the second mount part M2 in the longitudinal direction of the side member 6 (not shown).

Both the side member front portions 6a and the side member rear portions 6b decline rearward in side view (see FIG. 4). More specifically, the side member front portions 6a tilt outward in the vehicle width direction in plan view from the front end toward the second mount part M2 (see FIGS. 2 and 3), and the left and right side member rear portions 6b extend in parallel in the longitudinal direction in plan view (see the same drawings). Lower portions of the rear ends of the side member rear portions 6*b* are provided with side member-side coupling parts 92*a* of, for example, attachment holes to which the brace 80 is attached with attachment members (not shown) such as bolts and nuts N or fasteners (see FIG. 7).

As illustrated in FIGS. 1 through 5 and 7, the sub-frame front structure 10 includes sub-crash can attachment parts 12, front vehicle body attachment parts 13, tension rod supporting parts 14, and closed-section coupling parts 15 interposed between the sub-crash cans 7 and the side members 6, arranged in this order from the front to the rear, and serving as set plates for attaching rear brackets (rear flanges) 7*b* of the sub-crash cans 7.

Figure 9A:
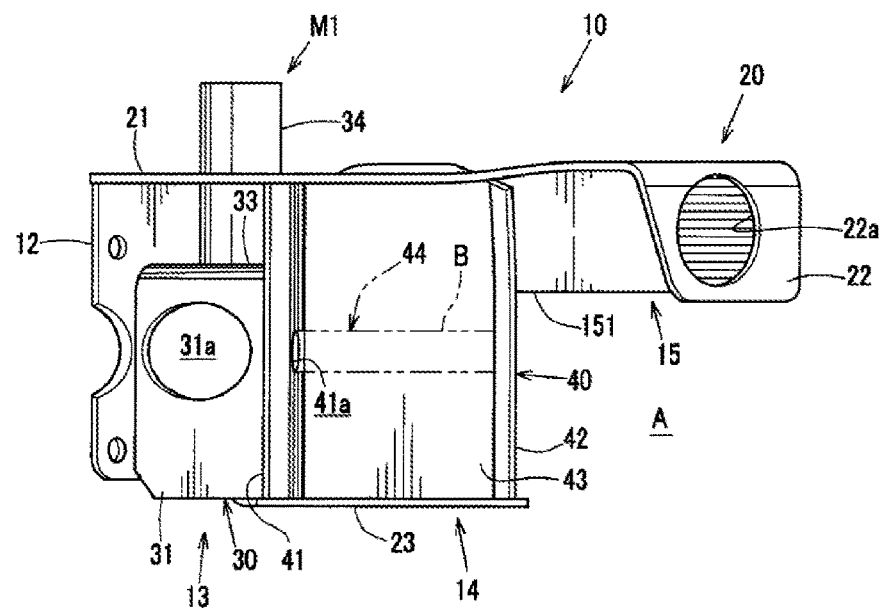
FIG. 9A is an illustration of a configuration of a front structure of the sub-frame.
Figure 9B:
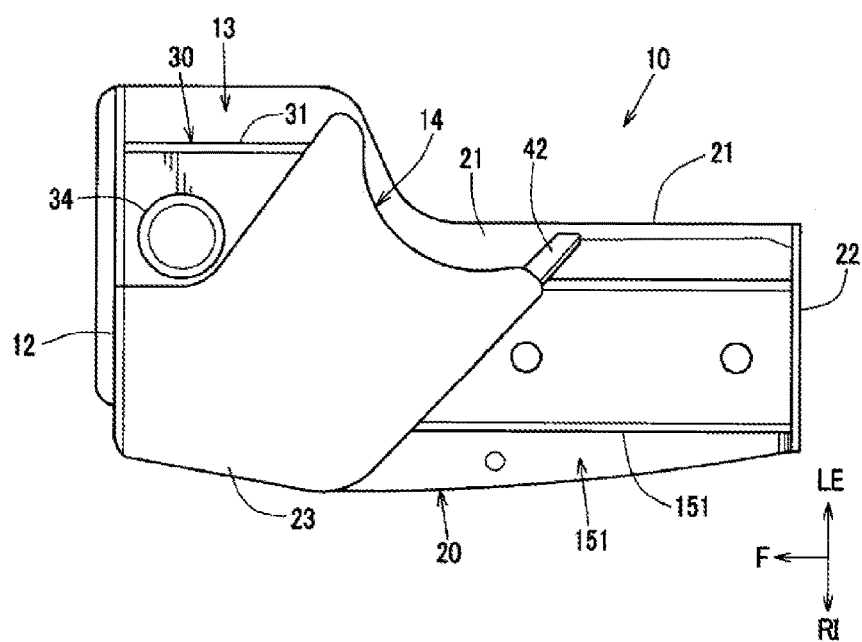
FIG. 9B is an illustration of the configuration of the front structure of the sub-frame.

In other words, as illustrated in FIGS. 8, 9A, and 9B, the sub-frame front structure 10 is constituted by assembling a plurality of panel members in a three-dimensional shape, and includes sub-frame front structure bodies 20, tension rod supporting brackets 40, and closed-section forming panels 151.

FIG. 8 is a disassembled perspective view of a front portion of the front sub-frame, especially the sub-frame front structure. Reference numeral 59 in FIG. 8 denotes a radiator supporting bracket. FIG. 9A is a perspective view of the left sub-frame front structure when viewed from an obliquely left rear portion at an angle of 45 degrees. FIG. 9B is a bottom view of the sub-frame front structure.

Each of the sub-frame front structure bodies 20 includes an upper face portion 21 having a length corresponding to the length of the sub-frame front structure 10 in the longitudinal direction, a rear face portion 22 bending downward from the rear end of the upper face portion 21 and having a protruding shape, a sub-crash can attachment part 12 which corresponds to the front face of the sub-frame front structure 10 and to which the rear bracket 7*b* of the sub-crash can 7 is attached, and a bottom face portion 23 (see the same drawings).

As illustrated in FIG. 9A, the rear face portion 22 corresponds to the rear face of the closed-section coupling part 15, has a circular opening 22*a* in which a front portion of the side member 6 is inserted, and is formed as a side member joint face that is joined and fixed with the front end of the side member 6 inserted in the opening 22*a*.

As illustrated in FIGS. 4, 5, and 8, the sub-crash can attachment part 12 corresponds to the front face of the sub-frame front structure 10, and is formed as a set plate having a substantially rectangular shape in front view larger than the rear bracket 7*b* at the rear end of the sub-crash can 7.

The rear bracket 7*b* at the rear end of the sub-crash can 7 faces the sub-crash can attachment part 12, and as illustrated in FIGS. 4 and 5, the sub-crash can 7 is fastened and fixed with a bolt B and a nut (not shown), for example, and is coupled to the sub-frame front structure 10.

In addition, as illustrated in FIGS. 4, 7, 8, and 9A, the sub-frame front structure body 20 includes a sub-crash can load transferring member 30 below the upper face portion 21 in a portion corresponding to the front vehicle body attachment part 13 described later. The sub-crash can load transferring member 30 has an outer face 31, an inner face 32 (see FIG. 7), and a partition wall 33 that form an arch shape (a substantially U shape; a Japanese character "コ", an angular "U") that is open downward in cross section taken orthogonally to the longitudinal direction. The sub-crash can load transferring member 30 is bridged between the rear face of the sub-crash can attachment part 12 and a front wall face 41 of the tension rod supporting part 14 (see FIGS. 4, 7, and 9A).

As illustrated in FIGS. 1, 4, 7, 8, and 9A, the outer face 31 of the sub-crash can load transferring member 30 has a service hole 31*a* (a through hole for work) having an oval shape having its longer axis oriented in the longitudinal direction.

The partition wall 33 corresponds to the upper surface of the sub-crash can load transferring member 30, is formed to couple, in the vehicle width direction, the upper ends of the outer face 31 and the inner face 32 supporting each other in the vehicle width direction, faces the upper face portion 21 of the sub-frame front structure 10 from below the upper face portion 21, and partitions internal space of the front vehicle body attachment part 13 into upper and lower parts. That is, the front vehicle body attachment part 13 does not have a bottom face and is open at the bottom, and the upper face portion 21 and the partition wall 33 constitute a two-storied structure.

As illustrated in FIGS. 1 through 5 and 9A, the front vehicle body attachment part 13 (a so-called "protruding member") in the sub-frame front structure 10 is provided with the mount pipe 34 communicating in the vertical direction (top-bottom direction) in center portions of the upper face portion 21 and the partition wall 33 in plan view and standing and extending in a tower shape upward from the upper face portion 21, and constitutes the first mount part M1.

In addition, as illustrated in FIG. 8, each of the tension rod supporting brackets 40 has a front wall face 41 and a rear wall face 42 each extends rearward at the outer side in the vehicle width direction and a laterally inner wall face 43 coupling the laterally inner front ends of the front and rear wall faces 41 and 42 toward laterally inner rear portions. The front wall face 41, the rear wall face 42, and the laterally inner wall face 43 form a substantially U shape in plan view that is open rearward and outward in the vehicle width direction. The tension rod supporting bracket 40 is interposed between the upper face portion 21 and the bottom face portion 23 of the sub-frame front structure body 20 (see also FIGS. 1, 4, 7, 9A, and 9B).

As illustrated in FIGS. 8 and 9A, the front wall face 41 and the rear wall face 42 of the tension rod supporting bracket 40 include opposed tension rod supporting holes 41*a*. A bolt B bridged between the pair of tension rod supporting holes 41*a* and 41*a* and a nut (not shown) for fastening the bolt B constitute a tension rod supporting shaft 44 for pivotally supporting a proximal end of the tension rod 51. The tension rod supporting bracket 40 including the tension rod supporting shaft 44 is formed as the tension rod supporting part 14 (see FIGS. 3 and 9A).

In addition, as illustrated in FIGS. 1 through 3 and 7, the lateral ends of the sus-cross member 73 described above are coupled to the lateral inner surfaces of the laterally inner wall faces 43 in the tension rod supporting parts 14.

As illustrated in FIG. 8, the closed-section forming panel 151 has a hat shape that is open upward in a cross section orthogonal to the longitudinal direction. As illustrated in FIGS. 7, 9A, and 9B, the closed-section forming panel 151 is joined to the lower surface of a rear portion of the upper face portion 21 of the sub-frame front structure body 20 to thereby constitute the closed-section coupling part 15 having a closed cross section extending in the longitudinal direction.

In addition, as illustrated in FIGS. 3, 4, 7, and 9A, a recess A that is open downward for arranging the steering rack 55, for example, is formed behind the tension rod supporting part 14 and below the closed-section coupling part 15.

As illustrated in FIGS. 1 through 6, the stabilizer 100 is disposed and extends in the vehicle width direction along the laterally inner wall face 43 of the tension rod supporting part 14 and the sus-cross member 73.

Specifically, the stabilizer 100 extends substantially horizontally in the vehicle width direction near a portion behind the sus-cross member 73, and the lateral ends of the stabilizer 100 extend with a tilt rearward and outward in the vehicle width direction across and below the closed-section coupling part 15 in plan view. A portion of the stabilizer 100 below and across the closed-section coupling part 15 extends horizontally in the vehicle width direction to pass over the recess A below the closed-section coupling part 15 (see FIGS. 3 and 4).

As well known, the stabilizer 100 is used to reduce a roll angle in a bump or a rebound of only one wheel caused by resistance of torsional stiffness.

As illustrated in FIGS. 1, 3, and 4, the stabilizer 100 described above is fastened and fixed to the lower surface of the closed-section coupling part 15 with a bolt B and a nut (not shown), while being held by the stabilizer attaching bracket 60 holding the stabilizer 100. In this manner, the stabilizer support part 62 is constituted by the stabilizer attaching bracket 60 holding the stabilizer 100, and the stabilizer support part 62 is disposed in the recess A.

As illustrated in FIGS. 1, 3, 4, 7, and 8, joint portions of the rear cross member 74 to the side members 6 and 6 at both ends in the vehicle width direction are provided with arm supporting parts 71 supporting the proximal ends of the lower arms 52 in such a manner that the lower arms 52 extending outward in the vehicle width direction can be pivotally supported in the vertical direction in order to determine the position of the front wheels in the vehicle width direction. That is, the left and right side members 6 and 6 support the lower arms 52 through the rear cross member 74.

In addition, as illustrated in FIGS. 1, 4, 6, and 7, a pair of left and right tilt members 75 is disposed behind the front sub-frame 5. The distance between the tilt members 75 and 75 in the vehicle width direction gradually increases toward the rear in plan view (i.e., the tilt members 75 and 75 form a Japanese character "ハ"). Specifically, the front ends of the tilt members 75 are joined to left and right intermediate portions laterally separated from a laterally intermediate portion of the rear cross member 74, and linearly tilt rearward and outward in the vehicle width direction so that the distance between the tilt members 75 increases toward the rear to couple the left and right intermediate portions to the third mount parts M3 as rear-end vehicle attachment parts of the left and right side members 6 (see FIGS. 2, 3, and 7). Below and ahead of the tilt members 75, tilt member-side coupling parts 91a of, for example, attachment holes for attaching the brace 80 with attachment members (not shown) such as bolts and nuts or fasteners (see FIG. 7).

As illustrated in FIGS. 1 through 6, the brace 80 includes a plurality of brace members 81, 82, and 83 described later disposed to constitute a plane substantially orthogonal to the vertical direction. The brace 80 is disposed below the pair of left and right side member rear portions 6b and 6b and the rear cross member 74 extending in the vehicle width direction ahead of the members 6b and 6b, and covers space that formed by the members 6b, 6b, and 74 and having a substantially U shape open to the rear in plan view.

Specifically, as illustrated in FIGS. 1 through 3 and 7, the brace 80 integrally includes the X-shaped member body 81 (X-shaped beam), the pair of left and right longitudinally extending members 82 and 82 (longitudinal beams), and the rear-end laterally extending member 83 (lateral beam).

The X-shaped member body 81 includes: one diagonally extending member 81a linearly coupling the left arm supporting part 71 to the third mount part M3 (rear vehicle body attachment part) of the right side member 6 diagonally disposed to the left arm supporting part 71 in plan view; and another diagonally extending member 81a linearly coupling the right arm supporting part 71 to the third mount part M3 (rear vehicle body attachment part) of the left side member 6 diagonally disposed to the right arm supporting part 71. These diagonally extending members 81a and 81a constituting a pair are crossed at the center to form an X shape in plan view (see FIGS. 3 and 7).

The longitudinally extending members 82 and 82 extend longitudinally at the left and right sides of the brace 80. That is, left and right longitudinally extending members 82 and 82 constituting a pair are disposed to linearly couple proximal ends 71a of the corresponding arm supporting parts 71 (laterally inner ends of the arm supporting parts 71) (see FIGS. 3 and 7) to the rear vehicle body attachment parts (third mount parts M3) of the side members 6.

In the manner described above, the proximal ends 71a of the arm supporting parts 71 are displaced to the inside in the vehicle width direction relative to the joint portions of the rear cross member 74 to the side members 6 in the vehicle width direction. The proximal ends 71a of the arm supporting parts 71 are provided with rear cross member-side coupling parts 90a of, for example, attachment holes for attaching the brace 80 with attachment members (not shown) such as bolts and nuts N or fasteners (see FIG. 7).

The brace 80 is disposed in such a manner that the pair of left and right longitudinally extending members 82 and 82 gradually tilt inward in the vehicle width direction relative to the longitudinal direction in which the side members 6 extend (see FIG. 3).

As illustrated in FIGS. 1 through 3 and 7, the rear-end laterally extending member 83 extends in the vehicle width direction at the rear end of the brace 80. That is, the rear-end laterally extending member 83 extends to linearly couple the third mount parts M3 of the left and right side members 6 and 6 to each other.

The X-shaped member body 81, the pair of left and right longitudinally extending members 82 and 82, and the rear-end laterally extending member 83 are integrally joined together and form a brace face. Thus, the assembly of the members forming a triangular shape (truss shape) in plan view can be disposed on a place constituting the brace face (see the same drawings).

The front ends of the left and right longitudinally extending members 82 of the brace 80 (front ends of the X-shaped member body 81) are provided with brace front coupling parts 90b of, for example, attachment holes for connectably attaching attachment members (not shown) such as bolts and nuts N or fasteners to the rear cross member 7 (see FIG. 7).

Front portions of the left and right diagonally extending members 81a of the brace 80 are provided with brace intermediate coupling parts 91b of, for example, attachment holes for connectably attaching attachment members (not shown) such as bolts and nuts N or fasteners to front portions of the tilt members 75 (see the same drawing).

The rear ends of the left and right longitudinally extending members 82 of the brace 80 (i.e., rear ends of the X-shaped member body 81) are provided with brace rear-side coupling parts 92b of, for example, attachment holes for connectably attaching attachment members (not shown) such as bolts and nuts N or fasteners to the side members 6 (see the same drawing).

Although the brace 80 according to this embodiment does not include a front-end laterally extending member that extends in the vehicle width direction at the front end of the brace 80, but may include additional members s appropriate.

As illustrated in FIGS. 1 through 4 and 6, the brace 80 described above is disposed below the body-side rear portion of the sub-frame 5, that is, below the side members 6, the rear cross member 74, and the tilt members 75, and are attached to the left and right sides of these members 74, 75, and 6 with front coupling parts 90, intermediate coupling parts 91, and rear coupling parts 92.

As illustrated in FIGS. 3 and 7, the front coupling parts 90 are constituted by the rear cross member-side coupling parts 90a, the brace front coupling parts 90b, and the attachment members (for which only nuts N are shown in FIG. 3). The rear cross member-side coupling parts 90a and the brace front coupling parts 90b are coupled to each other through attachment members.

The intermediate coupling parts 91 are constituted by the tilt member-side coupling parts 91a, the brace intermediate coupling parts 91b, and attachment members (for which only nuts N are shown in FIG. 3). The tilt member-side coupling parts 91a and the brace intermediate coupling parts 91b are coupled to each other through attachment members (see the same drawings).

The rear coupling parts 92 are constituted by the side member-side coupling parts 92a, the brace rear-side coupling parts 92b, and attachment members (for which only nuts N are shown in FIG. 3). The side member-side coupling parts 92a and the brace rear-side coupling parts 92b are coupled to each other through the attachment members (see the same drawings).

The front sub-frame 5 according to this embodiment is constituted by the left and right side member rear portions 6b and 6b and the rear cross member 74 to form a substantially U shape that is open at the rear in plan view. Above this substantially U-shaped inner space open to the rear in plan view, a longitudinal engine (not shown) in which crank shafts are arranged in the longitudinal direction is disposed. Thus, as illustrated in FIGS. 1 through 7, engine mount brackets 72 for mounting the longitudinal engine are disposed at corners between the left and right side member rear portions 6b and 6b and the rear cross member 74.

The engine mount brackets 72 are integrally joined by welding to each of the rear cross member 74, the tilt members 75, and the side members 6. That is, these members 6, 74, and 75 are coupled to each other through the engine mount brackets 72.

As described above, the front sub-frame structure according to this embodiment includes: the rear cross member 74 coupling the arm supporting parts 71 and 71 supported by the left and right side members 6 and 6 of the front sub-frame 5 (see FIGS. 1 through 8); the tilt members 75 coupling the laterally separated left and right intermediate portions of the rear cross member 74 to the third mount parts M3 (rear vehicle body attachment parts) on the rear portions of the side members 6 and 6 (see FIGS. 1 through 4, 6, and 7); the brace 80 coupling the left and right arm supporting parts 71 and 71 to the third mount parts M3 diagonally disposed to the arm supporting parts 71 and 71; and the intermediate coupling parts 91 coupling the brace 80 to the intermediate portions of the tilt members 75 (see FIG. 3).

This configuration includes the intermediate coupling parts 91 coupling the brace 80 to the intermediate portions of the tilt members 75 extending rearward and tilting outward in the vehicle width direction from the laterally separated left and right intermediate portions of the rear cross member 74 to the third mount parts M3 on the rear portions of the side members 6 and 6 at the left and right of the rear portion of the front sub-frame 5. Thus, even in a case where the brace 80 is thin, the brace 80 can effectively achieve functions as the brace 80.

Specifically, the side members 6, the lower arms 52 (lateral links), and the tension rods 51 are disposed to form triangles in plan view below a front portion of the front sub-frame 5. On the other hand, since there is a request for minimizing the height of the engine in order to lower the barycenter of the vehicle, this embodiment employs the longitudinal engine (not shown) in which crank shafts are arranged in the longitudinal direction, and the engine is disposed in a rear portion of the front sub-frame 5 where the lower arms 52 and the tension rods 51, for example, are not disposed.

On the other hand, the rear portion of the front sub-frame 5 has the frame structure with a trapezoidal shape in plan view constituted by the rear cross member 74 coupled to the left and right arm supporting parts 71 and the left and right side member rear portions 6b and 6b extending rearward. If the engine is mounted on the rear portion with such low stiffness, it might be difficult to maintain support stiffness in traveling.

In particular, in the case of mounting the longitudinal engine described above, there might be difficulty in obtaining engine support stiffness because of a reaction force in wheels rotating with driving of the engine in pressing an accelerator.

In such a case, low engine support stiffness might adversely affect responsiveness in steering the steering wheel, and thus, stiffness of the vehicle needs to be increased in traveling, especially in turning. The configuration in which the engine is disposed in the rear portion of the front sub-frame 5 also has an issue of obtaining engine support stiffness.

In view of this issue, in this embodiment, the tilt members 75 are disposed in the rear portion of the front sub-frame 5 to couple the laterally separated left and right intermediate portions of the rear cross member 74 to the third mount parts M3 of the side member rear portions 6b and 6b, and the tilt members 75 are coupled to the brace 80 by the intermediate coupling parts 91. Thus, even in the case where the engine is mounted in the rear portion of the front sub-frame 5, engine support stiffness can be maintained.

Specifically, if the rear portion of the front sub-frame 5 were reinforced only by the brace 80 without using the tilt members 75, the brace 80, which is thin itself, might fluctuate vertically and fail to receive a load. On the other hand, in this embodiment, the tilt members 75 having high stiffness are provided and the intermediate coupling parts 91 couple the tilt members 75 to the brace 80. Thus, integration of these members is enhanced so that the tilt members 75 can reinforce the brace 80, and the tilt members 75 and the plurality of members 81 (81a and 81a), 82, and 83 constituting the brace 80 can form a plurality of truss structures in plan view in the rear portion of the front sub-frame 5. Accordingly, the tilt members 75 restrict deformation of substantially trapezoidal shapes in plan view constituted by the left and right side members 6 and 6 and the rear cross member 74 extending in the vehicle width direction in a direction to a rhombus shape such as a parallelogram in plan, and in addition, can restrict vertical deformation of the brace 80 so that functions as the brace 80 can be enhanced.

That is, a synergistic effect of the tilt members 75 and the brace 80 can enhance engine support stiffness of the rear portion of the front sub-frame 5.

In addition, although not shown, when the brace 80 is attached to the upper surface of an undercover with, for example, a fastener, this brace 80 can also function as a reinforcing member for the under cover. The under cover is a cover for covering the front sub-frame 5 under the vehicle floor in order to improve aerodynamic characteristics or protect the suspension during traveling against water, mud, stepping stones, and so forth.

In the manner described above, the brace 80 is disposed as a reinforcing member for the under cover so that the under cover can be reinforced and the panel-shaped under cover itself can be made thin so that the vehicle weight can be reduced.

In an aspect of the technique disclosed in this specification, the rear cross member 74, the tilt members 75, and the side members 6 are coupled to each other by the welding engine mount brackets 72 (see FIGS. 1, 2, and 6).

With this configuration, the left and right engine mount brackets 72 are coupled to the rear cross member 74, the tilt members 75 and the side members 6, and thus engine support stiffness by the left and right engine mount brackets 72 can be enhanced. In this manner, no additional engine supporting structure needs to be provided in a lateral center portion, and the engine can be disposed at a low height so that the vehicle barycenter can be lowered, and a roll and traction can be improved. In addition, integration of the rear cross member 74, the tilt members 75, and the side members 6 can be enhanced, and thus, suspension support stiffness as well as engine support stiffness can be increased.

In an aspect of the technique disclosed in this specification, the brace 80 includes the left, right, and rear brace members 82, 82, and 83 (see FIGS. 1 through 3 and 7).

With this configuration, the brace 80 itself is configured to include a plurality of truss shapes by using the X-shaped member bodies 81 crossing each other, the left and right longitudinally extending members 82 and 82, and the rear-end laterally extending member 83. Accordingly, the number of truss structures can be increased so that stiffness can be enhanced.

In an aspect of the technique disclosed in this specification, the brace 80 according to this embodiment includes the left and right longitudinally extending members 82 and 82, and the rear ends of the longitudinally extending members 82 and 82 are coupled to the rear portions of the side members 6 provided with the third mount parts M3. That is, in the rear coupling parts 92, the side member-side coupling parts 92a and the brace rear-side coupling parts 92b are coupled to each other through attachment members. In addition, the longitudinally extending members 82 and 82 extend forward and gradually tilt inward in the vehicle width direction. The front ends of the longitudinally extending members 82 and 82 are coupled to the proximal ends 71a of the arm supporting parts 71 (see FIG. 3). That is, in the front coupling parts 90, the rear cross member-side coupling parts 90a and the brace front coupling parts 90b are coupled to each other through the attachment members.

That is, the longitudinally extending members 82 and 82 are disposed in such a manner that front portions of the members 82 tilt inward in the vehicle width direction relative to the side members 6. In this manner, the brace 80 can form truss structures by using the longitudinally extending members 82, the side members 6, and the rear cross member 74 at the left and right sides, and also by using the longitudinally extending members 82, the tilt members 75, and the diagonally extending members 81a. As a result, stiffness can be further increased.

In the relationship between the configuration of the technique disclosed in this specification and the embodiment described above, the sub-frame corresponds to the front sub-frame 5, and similarly, the cross member corresponds to the sus-cross member 73, the left and right brace members correspond to the longitudinally extending members 82, the rear brace member corresponds to the rear-end laterally extending member 83, and longitudinally one-side vehicle attachment part corresponds to the third mount part M3 (rear vehicle body attachment part), one side of the side member in the longitudinal direction corresponds to a rear portion of the side member 6, one end corresponds to the rear end. However, the technique disclosed in this specification is not limited only to the configuration of the embodiment described above.

For example, the intermediate coupling parts 91 (91a and 91b) may be fixed to each other, and at least one of the intermediate coupling parts 91 (91a and 91b) may be an oval hole so that these parts can be slidably coupled to each other in the plane direction of the brace 80. In such a case where the intermediate coupling parts 91 are slidably coupled to each other, stiffness enhancement by an increase in the number of truss structures decreases, but excessive concentration of stress to the intermediate coupling parts 91 can be reduced, and while the intermediate coupling parts 91 can be simplified and reduced in weight, vertical warpage of the brace 80 can be reduced, and stiffness can be effectively increased, as compared to a configuration simply using both the tilt members 75 and the brace 80.

INDUSTRIAL APPLICABILITY

As described above, the technique disclosed in this specification is useful for a front sub-frame structure including a cross member coupling arm supporting parts supported on left and right side members of a sub-frame and tilt members coupling laterally separated left and right intermediate portions of the cross member to longitudinally one-side vehicle attachment parts of the side members.

DESCRIPTION OF REFERENCE CHARACTERS (5) front sub-frame (sub-frame)
(6) side member
(71) arm supporting part
(72) engine mount bracket
(74) rear cross member (cross member)
(75) tilt member
(80) brace
(82) longitudinally extending member (left and right brace members)
(83) rear-end laterally extending member (rear brace member)
(91) intermediate coupling part
(M3) third mount part (longitudinally one-side vehicle attachment part)

The invention claimed is:
1. An automobile front sub-frame structure including a pair of left and right front side frames extending from a cabin front face toward a vehicle front, and a front sub-frame disposed below the front side frame and supporting a front suspension device, the front sub-frame structure comprising:

a cross member coupling arm supporting parts supported by the left and right side members of the front sub-frame;

tilt members coupling laterally separated left and right intermediate portions of the cross member to longitudinally one-side vehicle attachment parts of the side members, the longitudinally one-side vehicle attachment parts being disposed at one longitudinal side of the side members;

a brace coupling the left and right arm supporting parts to the longitudinally one-side vehicle attachment parts diagonally disposed to the arm supporting parts; and intermediate coupling parts coupling the brace to intermediate portions of the tilt members.

2. The front sub-frame structure of claim 1, wherein the cross member, the tilt members, and the side members are coupled to each other by engine mount brackets.

3. The front sub-frame structure of claim 1, wherein the brace includes brace members disposed at left and right portions of the brace and at the one longitudinal side of the brace.

\* \* \* \* \*